(12) United States Patent
Lee

(10) Patent No.: US 11,409,941 B2
(45) Date of Patent: Aug. 9, 2022

(54) SEMICONDUCTOR CHIP DESIGN METHOD AND COMPUTING DEVICE FOR PERFORMING THE SAME

(71) Applicant: Samsung Electronics Co., Ltd., Suwon-si (KR)

(72) Inventor: Sunghoon Lee, Incheon (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 17/171,267

(22) Filed: Feb. 9, 2021

(65) Prior Publication Data
US 2022/0012403 A1    Jan. 13, 2022

(30) Foreign Application Priority Data
Jul. 13, 2020  (KR) .................. 10-2020-0086439

(51) Int. Cl.
*G06F 30/398* (2020.01)
*G06F 30/394* (2020.01)
*G06F 119/18* (2020.01)

(52) U.S. Cl.
CPC .......... *G06F 30/398* (2020.01); *G06F 30/394* (2020.01); *G06F 2119/18* (2020.01)

(58) Field of Classification Search
USPC ....................................... 716/111
See application file for complete search history.

(56) References Cited

U.S. PATENT DOCUMENTS

| | | | | |
|---|---|---|---|---|
| 5,557,572 A | * | 9/1996 | Sawada | G11C 16/10 365/185.22 |
| 5,602,406 A | * | 2/1997 | Okabe | H01L 23/5222 257/202 |
| 5,991,308 A | * | 11/1999 | Fuhrmann | H03M 13/256 370/395.53 |
| 7,353,476 B2 | | 4/2008 | Imada et al. | |
| 8,037,442 B2 | | 10/2011 | Zou et al. | |
| 8,104,010 B2 | | 1/2012 | Imada | |
| 9,135,373 B1 | | 9/2015 | Jarosz et al. | |
| 2005/0216872 A1 | * | 9/2005 | Sung | G06F 30/30 716/103 |
| 2013/0298095 A1 | | 11/2013 | Yu et al. | |
| 2020/0229206 A1 | * | 7/2020 | Badic | H04W 28/0226 |
| 2022/0012403 A1 | * | 1/2022 | Lee | G06F 30/394 |

FOREIGN PATENT DOCUMENTS

| | | |
|---|---|---|
| CN | 103343681 A | 10/2013 |
| JP | 2006-084421 A | 3/2006 |

OTHER PUBLICATIONS

Matthew Hogan, Design With Calibre , "LEF/DEF IO Ring Check Automation", Dec. 15, 2015, https://blogs.mentor.com/calibre/blog/2015/12/15/lefdef-io-ring-check-automation/.

* cited by examiner

*Primary Examiner* — Mohammed Alam
(74) *Attorney, Agent, or Firm* — Harness, Dickey & Pierce, P.L.C.

(57) ABSTRACT

A method of designing a semiconductor chip includes: acquiring first data including information about arrangement of a plurality of cells on the semiconductor chip; acquiring second data including information about routing between the plurality of cells and power and signal lines; and outputting a verification result by detecting an error of arrangement of the plurality of cells based on matching of the first data and the second data.

20 Claims, 12 Drawing Sheets

FIG. 5

| DATA1 | |
|---|---|
| Pin Name | I/O Cell Name |
| PIN_1 | CELL_1 |
| PIN_2 | CELL_2 |
| ⋮ | ⋮ |
| PIN_k | CELL_k |

FIG. 6

| DATA2 | | | | |
|---|---|---|---|---|
| I/O Cell Name | PSL1 | PSL2 | ⋯ | PSLm |
| CELL_1 | \| | — | ⋯ | x |
| CELL_2 | \| | VDD | ⋯ | \| |
| ⋮ | ⋮ | ⋮ | ⋯ | ⋮ |
| CELL_k | \| | — | ⋯ | \| |

\| : Connected
— : Disconnected
x : Not exist

FIG. 7

| Pin Name | I/O Cell Name | PSL1 | PSL2 | ··· | PSLm |
|---|---|---|---|---|---|
| PIN_1 | CELL_1 | I | — | ··· | x |
| PIN_2 | CELL_2 | I | VDD | ··· | I |
| ⋮ | ⋮ | ⋮ | ⋮ | ··· | ⋮ |
| PIN_k | CELL_k | I | — | ··· | I |

DATA_M

I : Connected
— : Disconnected
x : Not exist

FIG. 8A

START
↓
SCAN CORRESPONDING COLUMN FOR EACH OF ALL POWER AND SIGNAL LINES — S220
↓
DETERMINE WHETHER TWO OR MORE DIFFERENT POWER SOURCES ARE SUPPLIED TO EACH RING INCLUDED IN COLUMN — S240
↓
OUTPUT VERIFICATION RESULT INCLUDING INFORMATION ABOUT SHORT ERROR IN RESPONSE TO FACT THAT TWO OR MORE DIFFERENT POWER SOURCES ARE SUPPLIED TO EACH RING INCLUDED IN COLUMN — S260
↓
END

FIG. 8B

DATA_M

| Pin Name | I/O Cell Name | PL1 (VDD) | PL2 (VSS) | PL3 (VSS0) | PL4 (VSSP) | SL1 (BIAS) |
|---|---|---|---|---|---|---|
| PIN_1 | CELL_1 | — | — | \| | — | — |
| PIN_2 | CELL_2 | VDD | — | — | — | BIAS |
| PIN_3 | CELL_3 | — | — | — | — | — |
| PIN_4 | CELL_4 | — | VSS | — | — | — |
| PIN_5 | CELL_5 | — | — | VSS0 | — | — |
| PIN_6 | CELL_6 | — | — | — | VDDP | — |
| PIN_7 | CELL_7 | — | — | DVSS | — | — |
| PIN_8 | CELL_8 | — | — | \| | — | — |

→ Short Error Occur

\| : Connected
— : Disconnected
x : Not exist

FIG. 8C

DATA_M

| Pin Name | I/O Cell Name | PL1 (VDD) | PL2 (VSS) | PL3 (VSS0) | PL4 (VSSP) | SL1 (BIAS) |
|---|---|---|---|---|---|---|
| PIN_1 | CELL_1 | — | — | — | — | — |
| PIN_2 | CELL_2 | VDD | — | — | — | BIAS |
| PIN_3 | CELL_3 | — | — | — | — | — |
| PIN_4 | CELL_4 | — | VSS | VSS0 | — | — |
| PIN_5 | CELL_5 | — | — | — | — | — |
| PIN_6 | CELL_6 | — | — | DVSS | VDDP | — |
| PIN_7 | CELL_7 | — | — | — | — | — |
| PIN_8 | CELL_8 | — | — | — | — | — |

| : Connected
— : Disconnected
x : Not exist

FIG. 9B

Float Error Occur →

DATA_M

| Pin Name | I/O Cell Name | PL1 (VDD) | PL2 (VSS) | PL3 (VSS0) | PL4 (VSSP) | SL1 (BIAS) |
|---|---|---|---|---|---|---|
| PIN_1 | CELL_1 | — | — | — | — | — |
| PIN_2 | CELL_2 | VDD | — | — | — | — |
| PIN_3 | CELL_3 | — | — | — | — | — |
| PIN_4 | CELL_4 | — | VSS | — | — | — |
| PIN_5 | CELL_5 | — | — | VSS0 | — | — |
| PIN_6 | CELL_6 | — | — | — | VDDP | — |
| PIN_7 | CELL_7 | — | — | — | — | — |
| PIN_8 | CELL_8 | — | — | — | — | — |

| : Connected  
— : Disconnected  
x : Not exist

FIG. 10C

DATA_M

| Pin Name | Library | I/O Cell Name | PL1 (VDD) | PL2 (VSS) | PL3 (VSS0) | PL4 (VSSP) | SL1 (BIAS) |
|---|---|---|---|---|---|---|---|
| PIN_1 | LIB 1 | CELL_1 | — | — | — | — | — |
| PIN_2 | LIB 1 | CELL_2 | — | — | — | — | — |
| PIN_3 | LIB 1 | CELL_3 | VDD | — | — | — | — |
| PIN_4 | LIB 1 | CELL_4 | — | — | — | — | — |
| PIN_5 | LIB 1 | CELL_5 | — | VSS | — | — | — |
| PIN_6 | LIB 2 | CELL_6 | — | — | VSS0 | — | BIAS |
| PIN_7 | LIB 1 | CELL_7 | — | — | — | VDDP | — |
| PIN_8 | LIB 1 | CELL_8 | — | — | — | — | — |

Different Type Library Error Occur

| : Connected
— : Disconnected
x : Not exist

SEMICONDUCTOR CHIP DESIGN METHOD AND COMPUTING DEVICE FOR PERFORMING THE SAME

CROSS-REFERENCE TO RELATED APPLICATION

This application is based on and claims priority under 35 U.S.C. § 119 to Korean Patent Application No. 10-2020-0086439, filed on Jul. 13, 2020, in the Korean Intellectual Property Office, the disclosure of which is incorporated by reference herein in its entirety.

BACKGROUND

The inventive concepts relate to a computing device and/or a semiconductor chip design method thereof. For example, at least some example embodiments relate to a method of designing an input/output interface of a semiconductor chip.

Various semiconductor chips including an integrated circuit and the like include an input/output interface used to communicate between circuits inside a semiconductor chip and devices outside of the semiconductor chip. For example, the input/output interface may exchange a control signal, various types of voltage signals various types of data between the semiconductor chip and the devices outside of the semiconductor chip.

When an input/output interface of a semiconductor chip is designed, a designer may directly design input/output cells to be disposed on the semiconductor chip and may directly check and verify whether the designed input/output cells are disposed to properly operate. Accordingly, a lot of time and expenses have been taken in a design process, and the reliability of a verification process is low.

SUMMARY

The inventive concepts provide a method and/or an apparatus for detecting a design error on an input/output interface of a semiconductor chip without direct intervention of a designer with respect to a computing device and a semiconductor chip design method thereof.

According to an aspect of the inventive concepts, there is provided a method of designing a semiconductor chip, the method including: acquiring first data indicating an arrangement for a plurality of cells on the semiconductor chip; acquiring second data indicating routing between the plurality of cells and power and signal lines, the power and signal lines including at least one power line and at least one signal line; and outputting a verification result by detecting at least one error in the arrangement of the plurality of cells based on the first data and the second data.

According to another aspect of the inventive concepts, there is provided a method of designing a semiconductor chip, the method including: acquiring first data indicating an arrangement for a plurality of cells on the semiconductor chip; acquiring second data including routing information and a plurality of pieces of library information, the routing information indicating routing between the plurality of cells and power sources, the plurality of pieces of library information corresponding to the plurality of cells; acquiring merged data by merging the routing information of corresponding cells amongst the second data and the first data; detecting at least one error among a short error, a float error, and a different type library error based on the merged data; and outputting a verification result indicating the at least one error.

According to another aspect of the inventive concepts, there is provided a computing device including: at least one processor; and a memory storing instructions that, when executed by the at least one processor, configure the computing device to, acquire first data indicating an arrangement for a plurality of cells on a semiconductor chip; acquire second data indicating routing between the plurality of cells and power and signal lines, the power and signal lines including at least one power line and at least one signal line; and output a verification result by detecting at least one error in the arrangement of the plurality of cells based on the first data and the second data.

According to another aspect of the inventive concepts, there is provided a program stored in a non-transitory computer-readable recording medium, the program performing operations in at least one of the methods.

BRIEF DESCRIPTION OF THE DRAWINGS

Example embodiments of the inventive concepts will be more clearly understood from the following detailed description taken in conjunction with the accompanying drawings in which:

FIG. 5 is a view of first data according to an example embodiment of the inventive concepts;

FIG. 6 is a view of second data according to an example embodiment of the inventive concepts;

FIG. 7 is a view of merged data according to an example embodiment of the inventive concepts;

FIG. 8A is a flowchart of a semiconductor chip design method according to an example embodiment of the inventive concepts;

FIG. 8B is a view of merged data and short error detection according to an example embodiment of the inventive concepts;

FIG. 8C is a view of merged data according to an example embodiment of the inventive concepts;

FIG. 9B is a view of merged data and float error detection according to an example embodiment of the inventive concepts;

FIG. 10C is a view of merged data and different type library error detection according to an example embodiment of the inventive concepts;

DETAILED DESCRIPTION

Hereinafter, example embodiments of the inventive concepts will be described in detail with reference to the accompanying drawings.

Figure 1:
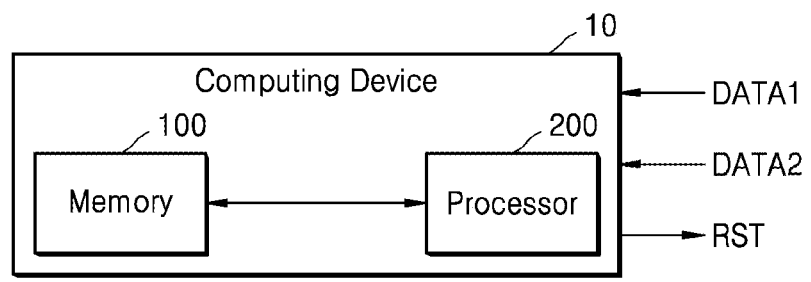
FIG. 1 is a block diagram of a computing device according to an example embodiment of the inventive concepts.

FIG. 1 is a block diagram of a computing device 10 according to an example embodiment of the inventive concepts. The computing device 10 may be implemented by, as a non-limited example, a smartphone, a tablet personal computer (PC), a video phone, an e-book reader, a desktop personal computer (PC), a laptop personal computer (PC), a netbook computer, a workstation, a server, a personal digital assistant (PDA), a portable multimedia player (PMP), an MP3 player, a mobile medical device, a camera, or a wearable device.

The computing device 10 may include a memory 100 and a processor 200. According to an example embodiment of the inventive concepts, the computing device 10 may include a single processor 200 or a plurality of processors.

According to an example embodiment of the inventive concepts, the computing device 10 may have a program installed therein and operate based on the installed program. The program may be stored in a computer-readable recording medium, for example, stored in the memory 100.

The memory 100 is a storage storing data and may store, for example, various algorithms, various kinds of programs, and various kinds of data. The memory 100 may include at least one of a volatile memory and a non-volatile memory. The non-volatile memory may include read only memory (ROM), programmable ROM (PROM), electrically programmable ROM (EPROM), electrically erasable and programmable ROM (EEPROM), flash memory, phase change random access memory (PRAM), magnetic RAM (MRAM), resistive RAM (RRAM), ferroelectric RAM (FRAM or FeRAM), or the like. The volatile memory may include dynamic RAM (DRAM), static RAM (SRAM), synchronous DRAM (SDRAM), PRAM, MRAM, RRAM, FeRAM, or the like. In addition, according to an example embodiment of the inventive concepts, the memory 100 may include at least one of a hard disk drive (HDD), a solid state drive (SSD), a compact flash (CF) card, a secure digital (SD) card, a micro secure digital (micro-SD) card, a mini secure digital (mini-SD) card, an extreme digital (xD) card, or a memory stick. The memory 100 may semi-permanently or temporarily store algorithms, programs, and a plurality of instructions to be executed by the computing device 10. According to an example embodiment of the inventive concepts, the memory 100 may store instructions to be executed by the computing device 10 when a semiconductor chip design method is performed. That is, the processor 200 may execute at least one instruction stored in the memory 100 so that the computing device 10 performs an operation in a semiconductor chip design method according to an example embodiment of the inventive concepts.

The processor 200 may control various operations of the computing device 10, and for example, the processor 200 may include a central processing unit (CPU) or an application processor (AP). The processor 200 may include a single core or multiple cores.

The processor 200 may be implemented using processing circuitry such as hardware including logic circuits, a hardware/software combination such as a processor executing software; or a combination thereof. For example, the processing circuitry may include, but is not limited to, a CPU, an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc.

The processing circuitry may be special purpose processing circuitry configured to detect an error in arrangement of input/output cells on a semiconductor chip and may correct the detected at least one error. Therefore the processing circuitry may improve the functioning of the computing device 10 itself.

The computing device 10 may acquire first data DATA1 and second data DATA2. Herein, the first data DATA1 and the second data DATA2 are associated with semiconductor chip design, wherein the first data DATA1 may include information about arrangement of a plurality of input/output cells on a semiconductor chip, and the second data DATA2 may include information about routing between the plurality of input/output cells and power and signal lines. Herein, the power and signal lines are used as a term indicating at least one power line and at least one signal line. That is, an input/output interface of a semiconductor chip according to an example embodiment of the inventive concepts may include at least one power line and at least one signal line, wherein the second data DATA2 may include information about routing between plurality of input/output cells and power and signal lines including at least one power line and at least one signal line. According to an example embodiment of the inventive concepts, the computing device 10 may receive the first data DATA1 and the second data DATA2 from the outside of the computing device 10. According to an example embodiment of the inventive concepts, the first data DATA1 and the second data DATA2 may be input by a semiconductor chip designer, e.g., a user of the computing device 10. The computing device 10 may detect an error in arrangement of input/output cells on a semiconductor chip based on the first data DATA1 and the second data DATA2 and output a verification result RST by generating the verification result RST based on the detected error.

According to an example embodiment of the inventive concepts, the processor 200 may detect an error of arrangement of input/output cells on a semiconductor chip based on matching of the first data DATA1 and the second data DATA2. According to an example embodiment of the inventive concepts, the processor 200 may acquire merged data by merging routing information of a corresponding input/output cell among the second data DATA2 with respect to each of the plurality of cells included in the first data DATA1. The processor 200 may detect an error based on information included in the merged data, the error including at least one of a short error, a float error, and a different type library error. The processor 200 may generate the verification result RST including information about the detected at least one error and output the verification result RST to the outside of the computing device 10.

In addition, according to an example embodiment of the inventive concepts, the processor 200 may modify the first data DATA1 and/or the second data DATA2 based on the verification result RST. For example, the processor 200 may correct the detected at least one error by modifying modification-required data in the first data DATA1 and/or the second data DATA2 based on a type and details of the detected at least one error, which are included in the verification result RST.

In addition, according to an example embodiment of the inventive concepts, the processor 200 may output error-corrected design data based on the first data DATA1, the second data DATA2, and the verification result RST, wherein the design data may indicate design information to be directly used to manufacture a semiconductor chip according to a design of the user. For example, the design data may include particular design data, e.g., chip layout design information, for arranging input/output cells on a semiconductor chip. In some example embodiments, the processor 200 may control a fabrication device to manufacture the semiconductor chip based on the error-corrected design data.

In addition, according to an example embodiment of the inventive concepts, the processor 200 may generate correction information including information about an error correction method for the first data DATA1 and/or the second data DATA2 based on the type and the details of the detected error, which are included in the verification result RST, and output the correction information to the outside of the computing device 10. According to an example embodiment of the inventive concepts, the processor 200 may display the correction information to the semiconductor chip designer, e.g., the user of the computing device 10, on a display device such as a display included in the computing device 10. The semiconductor chip designer may correct the arrangement error of input/output cells based on the correction information and manufacture a semiconductor chip based on the corrected result.

In addition, according to an example embodiment of the inventive concepts, the computing device 10 may merge the first data DATA1 including information about arrangement of a plurality of input/output cells on a semiconductor chip and the second data DATA2 including information about routing between the plurality of input/output cells and power and signal lines. Based on the merged data, the computing device 10 may detect at least one error among a short error, a float error, and a different type library error related to the input/output cell arrangement.

In addition, the computing device 10 according to an example embodiment of the inventive concepts may help the user of the computing device 10 to be aware of an error in a semiconductor chip design by outputting the verification result RST including information about an error. Accordingly, the semiconductor chip designer may detect a design error in an input/output interface of a semiconductor chip even without direct intervention of the designer. As a result, the time and expenses to be taken to find out the design error in the input/output interface may be saved, and an error may be more accurately found out.

Furthermore, the computing device 10 according to an example embodiment of the inventive concepts may help the user as the designer to accurately correct the error by providing, to the user of the computing device 10, an error correction method for the first data DATA1 and/or the second data DATA2 based on the verification result RST.

In addition, the computing device 10 according to an example embodiment of the inventive concepts may directly correct the design error without intervention of the designer by modifying the first data DATA1 and/or the second data DATA2 based on the verification result RST.

Figure 2:
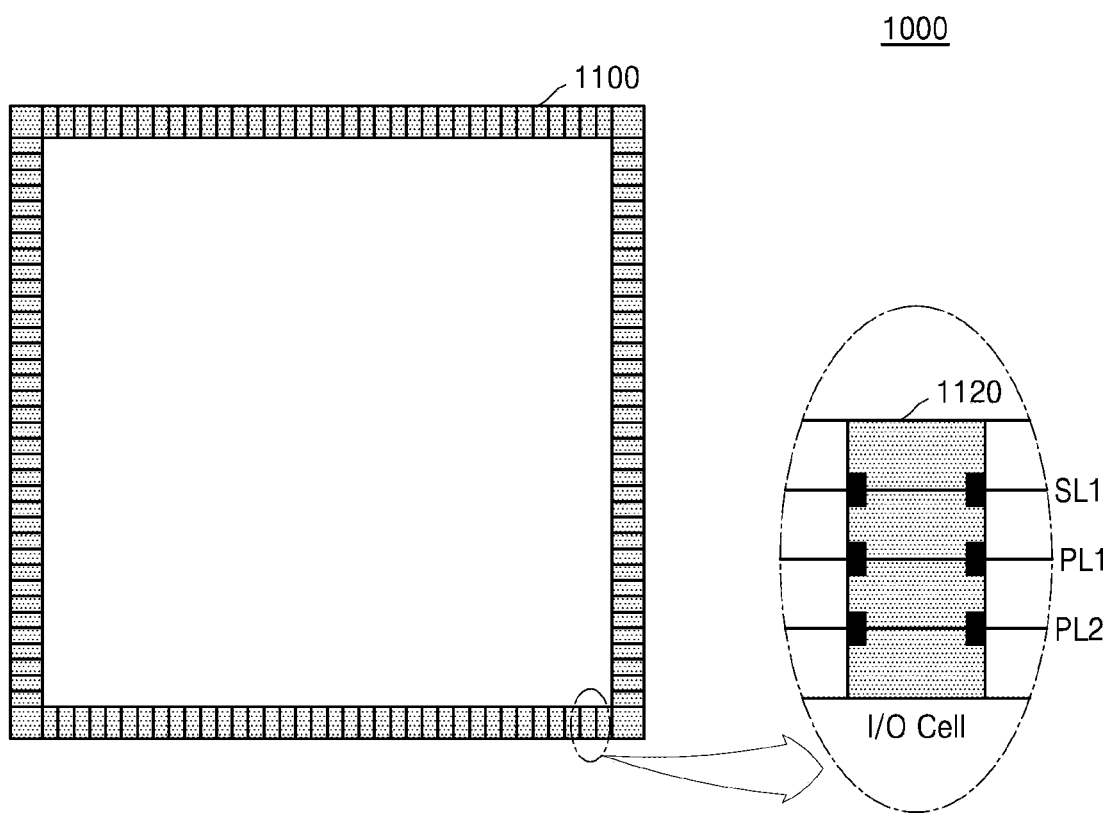
FIG. 2 is a view of a semiconductor chip according to an example embodiment of the inventive concepts.

FIG. 2 is a view of a semiconductor chip 1000 according to an example embodiment of the inventive concepts. FIG. 2 may particularly show the semiconductor chip 1000 manufactured according to a semiconductor chip design method according to an example embodiment of the inventive concepts. A particular shape, number, and the like of the semiconductor chip 1000 or an input/output interface 1100 are only for convenience of description and are not limited thereto.

Referring to FIG. 2, the semiconductor chip 1000 may include the input/output interface 1100 used to, for example, receive power from the outside, receive data and/or a control signal from the outside, and output data to the outside. In addition, according to an example embodiment of the inventive concepts, the input/output interface 1100 may generate an operating voltage required for internal circuits of the semiconductor chip 1000, based on a voltage input from the outside, and provide the operating voltage to the internal circuits of the semiconductor chip 1000. According to an example embodiment of the inventive concepts, the input/output interface 1100 may be implemented on the semiconductor chip 1000 in a shape encompassing the semiconductor chip 1000 to provide an interface between the internal circuits and the outside of the semiconductor chip 1000. In addition, according to an example embodiment of the inventive concepts, the input/output interface 1100 may include a plurality of input/output cells. The plurality of input/output cells may receive a voltage or power through at least one power line and receive a control signal through at least one signal line. Accordingly, a power source should be connected to each of the at least one power line, and a control signal should be supplied to the at least one signal line. A shape in which the at least one power line and the at least one signal line are connected along the input/output cells may have a similar shape to a shape in which the input/output cells are arranged, and thus have a ring shape, which may be referred to as a power line ring and/or a signal line ring.

For example, the plurality of input/output cells included in the input/output interface 1100 may include an input/output cell 1120. The input/output cell 1120 may be connected to at least one power line through at least one pin of the input/output cell 1120 and connected to at least one signal line through at least one pin. For example, the input/output cell 1120 may be connected to a first signal line SL1, a first power line PL1, and a second power line PL2. The number of power lines and the number of signal lines are only illustrative and are not limited thereto. A power line may be a line for delivering various types of driving voltages VDD and VSS or power, and a signal line may be a line for delivering control signals. In addition, as described above, the at least one power line and the at least one signal line may together be referred to as power and signal lines. In other words, the power and signal lines may include at least one power line and at least one signal line.

The input/output cell 1120 may provide a control signal to another input/output cell or receive a control signal from another input/output cell, through the first signal line SL1. In addition, the input/output cell 1120 may provide a voltage or power to another input/output cell or receive a voltage or power from another input/output cell, through the first power line PL1 and the second power line PL2.

For example, the first signal line SL1 may be connected to a plurality of input/output cells according to a designer's arrangement of input/output cells, and a unit of these connected first signal lines SL1 may be referred to as a signal line ring. In addition, the first power line PL1 may be connected to a plurality of input/output cells according to a designer's arrangement of input/output cells, and a unit of these connected first power lines PL1 may be referred to as a power line ring.

A single power line ring defined as described above should include one type of power source for providing a voltage or power. Therefore, designing arrangement of input/output cells so that two types of power sources are connected to a single power line ring may cause a short on a power line, thereby causing a power line fault. For example, when a power source for providing the voltage VDD and a power source for providing the voltage VSS are connected to a single power line ring, a fault may occur on a corresponding power line due to a short. Likewise, there should be one type of control signal provider for providing a control signal on a signal line ring defined as described above. Therefore, the designing of the arrangement of input/output cells so that two types of control signal providers are connected to a single signal line ring may cause a short on a signal line, thereby causing a signal line fault. The two cases are referred to as a short error related to the input/output cell arrangement.

In addition, likewise, connecting no power source to a single power line ring may cause a power line to float, thereby hindering a normal operation of input/output cells. This case is referred to as a float error related to the input/output cell arrangement.

In addition, according to an example embodiment of the inventive concepts, as described in more detail with reference to FIG. 10B, when input/output cells belonging to different libraries (or categories) are connected to a single power line ring or a single signal line ring, routing of the input/output cells may be incompletely performed due to mismatch between pins of adjacent input/output cells. As such, connecting two input/output cells belonging to different libraries to a single power line ring or a single signal line ring is referred to as a different type library error (or, alternatively, a mismatch error).

According to example embodiments, the short error, the float error, and the different type library error are detectable in an operation of designing the arrangement of input/output cells on the semiconductor chip 1000.

Figure 3:
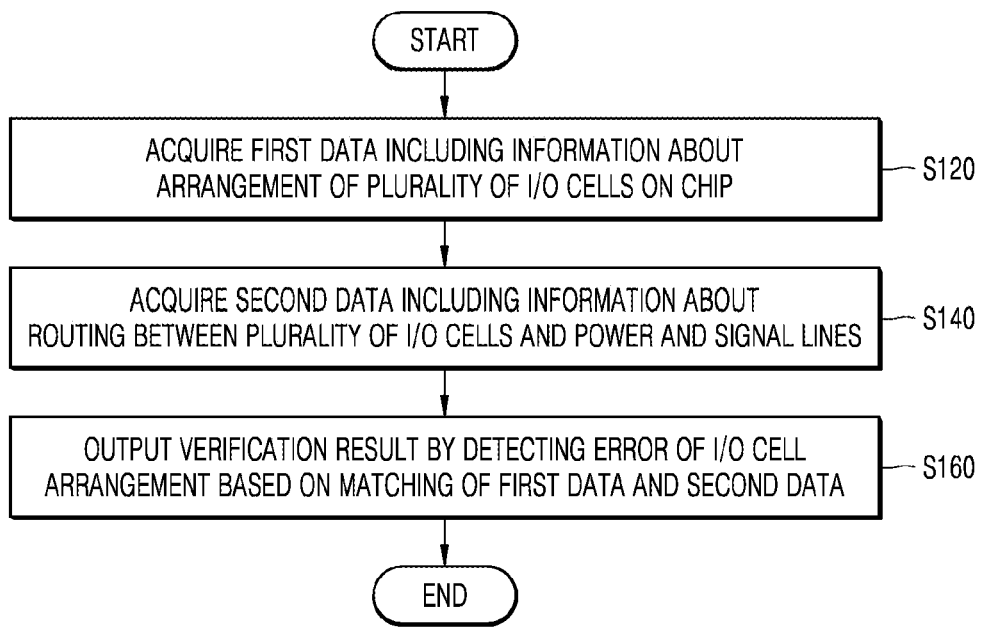
FIG. 3 is a flowchart of a semiconductor chip design method according to an example embodiment of the inventive concepts.

FIG. 3 is a flowchart of a semiconductor chip design method according to an example embodiment of the inventive concepts. FIG. 3 will be described with reference to FIG. 1 together.

Referring to FIGS. 1 and 3, in operation S120, the computing device 10 may acquire the first data DATA1 including information about arrangement of a plurality of input/output cells on a chip. According to an example embodiment of the inventive concepts, the first data DATA1 may include information about a plurality of input/output cells corresponding to a plurality of pin names on a semiconductor chip. Herein, the pin names may indicate information about locations where input/output cells are located on the semiconductor chip, according to an example embodiment of the inventive concepts. According to an example embodiment of the inventive concepts, the first data DATA1 may be referred to as a pin file and set or provided by a designer. An example embodiment of the first data DATA1 could be understood in more detail with reference to FIG. 5.

In operation S140, the computing device 10 may acquire the second data DATA2 including information about routing between the plurality of input/output cells and power and signal lines. According to an example embodiment of the inventive concepts, the second data DATA2 may include a matrix including a plurality of rows corresponding to a plurality of input/output cells and a plurality of columns corresponding to a plurality of power and signal lines, and each of elements of the matrix may include data indicating whether an input/output cell corresponding to a row is connected to a power line or a signal line corresponding to a column, or indicating a type of a power source or a control signal which the corresponding input/output cell supplies to the corresponding power line or signal line. According to an example embodiment of the inventive concepts, the second data DATA2 may be provided by the designer. An example embodiment of the second data DATA2 could be understood in more detail with reference to FIGS. 6 and 11A.

In operation S160, the computing device 10 may output the verification result RST by detecting an error of input/output cell arrangement based on the first data DATA1 and the second data DATA2, for example, by matching of the first data DATA1 and the second data DATA2. For example, the computing device 10 may generate merged data by matching (or merging) the first data DATA1 and the second data DATA2 and detect at least one error among a short error, a float error, and a different type library error based on the merged data. The computing device 10 may generate the verification result RST including information about the detected at least one error and output the verification result RST. Operation S160 will be described below in more detail with reference to FIG. 4.

According to an example embodiment of the inventive concepts, the computing device 10 may merge the first data DATA1 including information about arrangement of a plurality of input/output cells on a semiconductor chip and the second data DATA2 including information about routing between the plurality of input/output cells and power and signal lines, and detect at least one error among a short error, a float error, and a different type library error related to the input/output cell arrangement based on the merged data.

In addition, the computing device 10 according to an example embodiment of the inventive concepts may help the user of the computing device 10 to be aware of an error in a semiconductor chip design by outputting the verification result RST including information about an error. Accordingly, the semiconductor chip designer may detect a design error in an input/output interface of a semiconductor chip even without direct intervention of the designer. Accordingly, the time and expenses to be taken to find out the design error in the input/output interface may be saved, and an error may be more accurately found out.

Furthermore, the computing device 10 according to an example embodiment of the inventive concepts may help the user as the designer to accurately correct the error by providing, to the user of the computing device 10, an error correction method for the first data DATA1 and/or the second data DATA2 based on the verification result RST.

In addition, the computing device 10 according to an example embodiment of the inventive concepts may directly correct the design error without intervention of the designer by modifying the first data DATA1 and/or the second data DATA2 based on the verification result RST.

Therefore the processor 200 may be a special purpose processor that improves the functioning of the computing device 10 itself by automatically correcting a design error in the semiconductor chip design.

Figure 4:
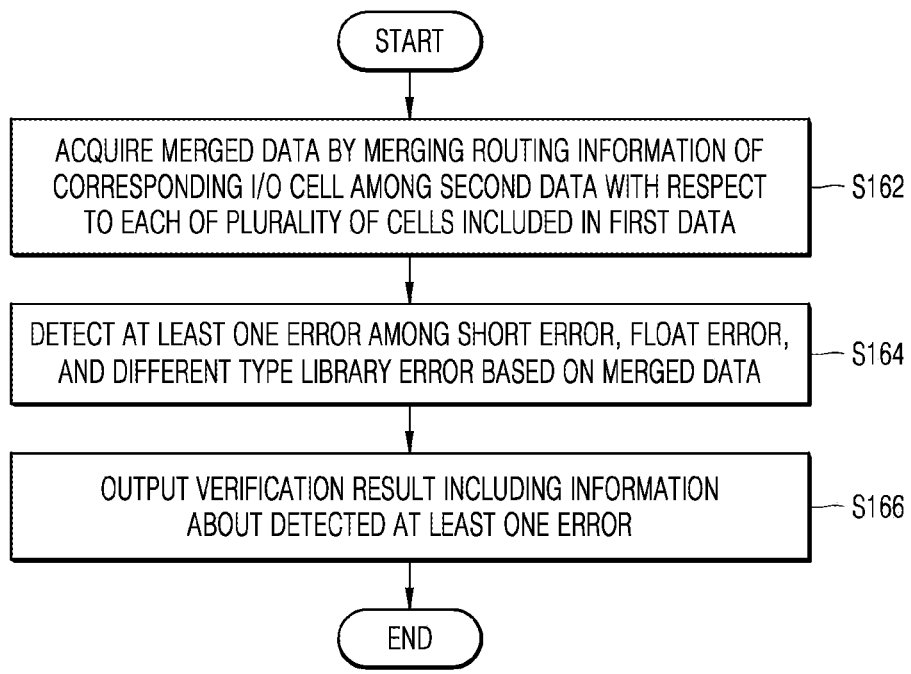
FIG. 4 is a flowchart of a semiconductor chip design method according to an example embodiment of the inventive concepts.

FIG. 4 is a flowchart of a semiconductor chip design method according to an example embodiment of the inventive concepts. Particularly, FIG. 4 may show a detailed flowchart of operation S160 of FIG. 3. FIG. 4 will be described with reference to FIG. 1 together.

Referring to FIGS. 1 and 4, in operation S162, the computing device 10 may acquire merged data by merging routing information of a corresponding input/output cell among the second data DATA2 with respect to each of the plurality of cells included in the first data DATA1. For example, the computing device 10 may acquire the merged data by merging a row corresponding to an input/output cell in a matrix included in the second data DATA2 with respect to each of the plurality of cells included in the first data DATA1.

In operation S164, the computing device 10 may detect at least one error among a short error, a float error, and a different type library error based on the merged data. A method of detecting a short error will be described below in more detail with reference to FIGS. 8A to 8C, a method of detecting a float error will be described below in more detail with reference to FIGS. 9A and 9B, and a method of detecting a different type library error will be described below in more detail with reference to FIGS. 10A to 10C.

In operation S166, the computing device 10 may output the verification result RST including information about the detected at least one error. For example, the verification result RST may include a type and details of the at least one error detected in operation S164, and the details of the at least one error may include information about a power line ring or a signal line ring and/or names of input/output cells on which the at least one error has occurred.

According to an example embodiment of the inventive concepts, the computing device 10 may correct at least one correction-required data among the first data DATA1 and the second data DATA2 based on the type and the details of the at least one error, which are included in the verification result RST. In addition, according to an example embodiment of the inventive concepts, the computing device 10 may provide an error correction method to the user of the computing device 10 based on the type and the details of the at least one error, which are included in the verification result RST. In other words, according to an example embodiment of the inventive concepts, the computing device 10 may guide a method of correcting an occurred error based on the verification result RST.

FIG. 5 is a view of the first data DATA1 according to an example embodiment of the inventive concepts. Particular details of the first data DATA1 shown in FIG. 5 are only illustrative for convenience of description.

Referring to FIG. 5, the first data DATA1 may include information about arrangement of a plurality of input/output cells on a chip. For example, the first data DATA1 may include information about a plurality of input/output cells corresponding to pin names on a semiconductor chip.

For example, the first data DATA1 may include information about that a first input/output cell CELL_1 is arranged to correspond to a first pin PIN_1, a second input/output cell CELL_2 is arranged to correspond to a second pin PIN_2, and likewise a kth input/output cell CELL_k is arranged to correspond to a kth pin PIN_k according to an inductive method (k is a natural number greater than or equal to 2).

According to an example embodiment of the inventive concepts, the first data DATA1 may include, in a matrix form, information about a plurality of input/output cells corresponding to a plurality of pin names.

FIG. 6 is a view of the second data DATA2 according to an example embodiment of the inventive concepts. Particular details of the second data DATA2 shown in FIG. 6 are only illustrative for convenience of description.

Referring to FIG. 6, the second data DATA2 may include information about routing between a plurality of input/output cells and a plurality of power and signal lines. For example, the second data DATA2 may include a matrix including a plurality of rows corresponding to a plurality of input/output cells, e.g., the first to kth input/output cells CELL_1, . . . , CELL_k, and a plurality of columns corresponding to a plurality of power and signal lines, e.g., first to mth power and signal lines PSL1, . . . , PSLm (k and m are natural numbers greater than or equal to 2, respectively, and are independent from each other). Herein, the power and signal lines PSL1, . . . , PSLm may include at least one power line and at least one signal line. Herein, each of elements of the matrix may include data indicating whether an input/output cell corresponding to a row is connected to or disconnected from a power line or a signal line corresponding to a column, whether the corresponding power line or signal line does not exist, or a type of a power source or a control signal which the corresponding input/output cell supplies to the corresponding power line or signal line.

Referring to FIG. 6, the first input/output cell CELL_1, the second input/output cell CELL_2, and the kth input/output cell CELL_k may be connected to the first power and signal line PSL1. The first input/output cell CELL_1 and the kth input/output cell CELL_k may be connected to the second power and signal line PSL2, and the second input/output cell CELL_2 may supply power VDD to the second power and signal line PSL2. In addition, a pin corresponding to the mth power and signal line PSLm may not exist for the first input/output cell CELL_1, and the second input/output cell CELL_2 and the kth input/output cell CELL_k may be connected to the mth power and signal line PSLm.

FIG. 7 is a view of merged data DATA_M according to an example embodiment of the inventive concepts. Particular details of the merged data DATA_M shown in FIG. 7 are only illustrative for convenience of description. For example, FIG. 7 may show the merged data DATA_M generated by merging the first data DATA1 of FIG. 5 and the second data DATA2 of FIG. 6.

While FIGS. 5 and 6 illustrate a plurality of input/output cells arranged in the same order in each of the first data DATA1 and second data DATA2, and this is only for convenience of description, but in an actual case, an order of the plurality of input/output cells included in a column of the second data DATA2 may differ from an order of the plurality of input/output cells included in a column of the first data DATA1. Therefore, a process, performed by the computing device 10, may include matching input/output cells included in the first data DATA1 and the second data DATA2 will be described with reference to FIGS. 1, 5, and 6 together.

Referring to FIGS. 1, 5 and 6, the computing device 10 may acquire the merged data DATA_M by merging a row corresponding to a corresponding input/output cell in the second data DATA2 with the first data DATA1 with respect to each of the plurality of input/output cells included in the first data DATA1.

The computing device 10 may detect at least one error among a short error, a float error, and a different type library error by using the merged data DATA_M generated by the process described above, and an error detection method will be described in more detail with reference to the following drawings.

FIG. 8A is a flowchart of a semiconductor chip design method according to an example embodiment of the inventive concepts. FIG. 8A may be particularly a flowchart of a method of detecting a short error having occurred in a semiconductor chip design during operation S164 of FIG. 4. FIG. 8A will be described with reference to FIG. 1 together.

In operation S220, the computing device 10 may scan a plurality of columns respectively corresponding to a plurality of power and signal lines by using merged data. For example, referring to FIG. 7 together, the computing device 10 may scan all columns corresponding to the first to mth power and signal lines PSL1 to PSLm in the merged data DATA_M.

In operation S240, the computing device 10 may determine whether two or more different power sources are supplied to each ring included in a corresponding column. Herein, a ring included in a column may indicate a path from a first cell to which no power and signal line is connected to a second cell to which no power and signal line is connected. Each power and signal line may include only one ring or a plurality of rings.

In operation S260, the computing device 10 may determine that a short error has occurred in the semiconductor chip design, in response to the fact that at least two types of power sources or control signals are supplied to a single ring included in a corresponding column, and output the verification result RST including information about the short error. For example, the verification result RST may include at least one of data indicating that a short error exists, information about a power and signal line on which the short error has occurred, and information about an input/output cell on which the short error has occurred.

An operation, performed by the computing device 10, of detecting a short error will be described below with reference to FIG. 8B.

FIG. 8B is a view of the merged data DATA_M and short error detection according to an example embodiment of the inventive concepts. Particular details of the merged data DATA_M shown in FIG. 8B are only illustrative for convenience of description. In addition, as a non-limited example, a plurality of power and signal lines may include the first power line PL1, the second power line PL2, a third power line PL3, a fourth power line PL4, and the first signal line SL1. FIG. 8B will be described with reference to FIGS. 1 and 8A together.

The computing device 10 may scan columns corresponding to the first to fourth power lines PL1 to PL4 and the first signal line SL1 in the merged data DATA_M.

The first power line PL1 includes one power line ring, and the power VDD is supplied to the first power line PL1 by a third input/output cell CELL_3, and thus, a short error has not occurred. Likewise, a short error has not occurred on the second power line PL2 and the fourth power line PL4. In addition, the power VDD is supplied to the first signal line SL1 by the second input/output cell CELL_2, and thus, a short error has not occurred.

However, the third power line PL3 includes a single power line ring, but power VSS0 is supplied to the power line ring included in the third power line PL3 by a fourth input/output cell CELL_4, and power DVSS is also supplied to the power line ring included in the third power line PL3 by a seventh second input/output cell CELL_7. Therefore, the computing device 10 may determine, in operation S240, that a short error has occurred on the third power line PL3. Accordingly, the computing device 10 may output, in operation S260, the verification result RST including information indicating that a short error has occurred, information about the third power line PL3, and information about the fourth second input/output cell CELL_4 and the seventh second input/output cell CELL_7.

FIG. 8C is a view of the merged data DATA_M according to an example embodiment of the inventive concepts. Compared with FIG. 8B, FIG. 8C shows a case where no short error has occurred. FIG. 8C will be described with reference to FIG. 1 together.

Differences of FIG. 8C from FIG. 8B will be mainly described.

The third power line PL3 may include two power line rings. For example, the third power line PL3 may include a first ring to which the second to fourth input/output cells CELL_2 to CELL_4 are connected and a second ring to which sixth to eighth input/output cells CELL_6 to CELL_8 are connected.

Referring to 8C, although both the power VSS0 and the power DVSS are supplied to the third power line PL3, the power VSS0 is supplied only to the first ring, and the power DVSS is supplied only to the second ring, and thus, no short error occurs. That is, whether a short error has occurred should be determined for each power line ring even in a single power line.

Figure 9A:
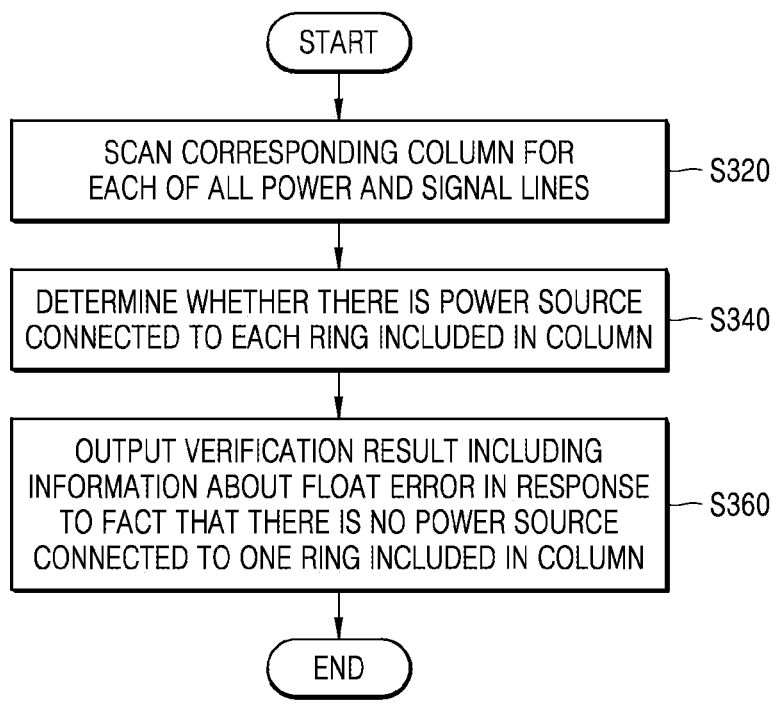
FIG. 9A is a flowchart of a semiconductor chip design method according to an example embodiment of the inventive concepts.

FIG. 9A is a flowchart of a semiconductor chip design method according to an example embodiment of the inventive concepts. FIG. 9A may be particularly a flowchart of a method of detecting a float error having occurred in a semiconductor chip design during operation S164 of FIG. 4. FIG. 9A will be described with reference to FIG. 1 together.

In operation S320, the computing device 10 may scan a plurality of columns respectively corresponding to a plurality of power and signal lines by using merged data. For example, referring to FIG. 7 together, the computing device 10 may scan all columns corresponding to the first to mth power and signal lines PSL1 to PSLm in the merged data DATA_M.

In operation S340, the computing device 10 may determine whether there is a power source connected to each ring included in a corresponding column. Herein, a ring included in a column may indicate a path from a first cell to which no power and signal line is connected to a second cell to which no power and signal line is connected. Each power and signal line may include only one ring or a plurality of rings.

In operation S360, the computing device 10 may determine that a float error has occurred in the semiconductor chip design, in response to the fact that there is no power source connected to one ring included in a column corresponding to a power line (or in response to the fact that no power source is supplied to one ring), and output the verification result RST including information about the float error. Alternatively, likewise, the computing device 10 may determine that a float error has occurred in the semiconductor chip design, in response to the fact that there is no control signal provider connected to one ring included in a column corresponding to a signal line. For example, the verification result RST may include at least one of data indicating that there is a float error, information about a power line or a signal line on which the float error has occurred, and information about an input/output cell on which the float error has occurred.

An operation, performed by the computing device 10, of detecting a float error will be described below with reference to FIG. 9B.

FIG. 9B is a view of the merged data DATA_M and float error detection according to an example embodiment of the inventive concepts. Particular details of the merged data DATA_M shown in FIG. 9B are only illustrative for convenience of description. FIG. 9B will be described with reference to FIGS. 1 and 9A together.

The computing device 10 may scan columns corresponding to the first to fourth power lines PL1 to PL4 and the first signal line SL1 in the merged data DATA_M.

The first power line PL1 includes one power line ring, and the power VDD is supplied to the first power line PL1 by the third input/output cell CELL_3, and thus, a float error has not occurred. Likewise, a float error has not occurred on the second power line PL2, the third power line PL3, and the fourth power line PL4.

When the first signal line SL1 is scanned, any control signal provider is not connected to the first signal line SL1, and any control signal is not provided to the first signal line SL1. Therefore, the computing device 10 may determine, in operation S340, that a float error has occurred on the first signal line SL1. Accordingly, the computing device 10 may output, in operation S360, the verification result RST including information indicating that a float error has occurred and information about the first signal line SL1.

Figure 10A:
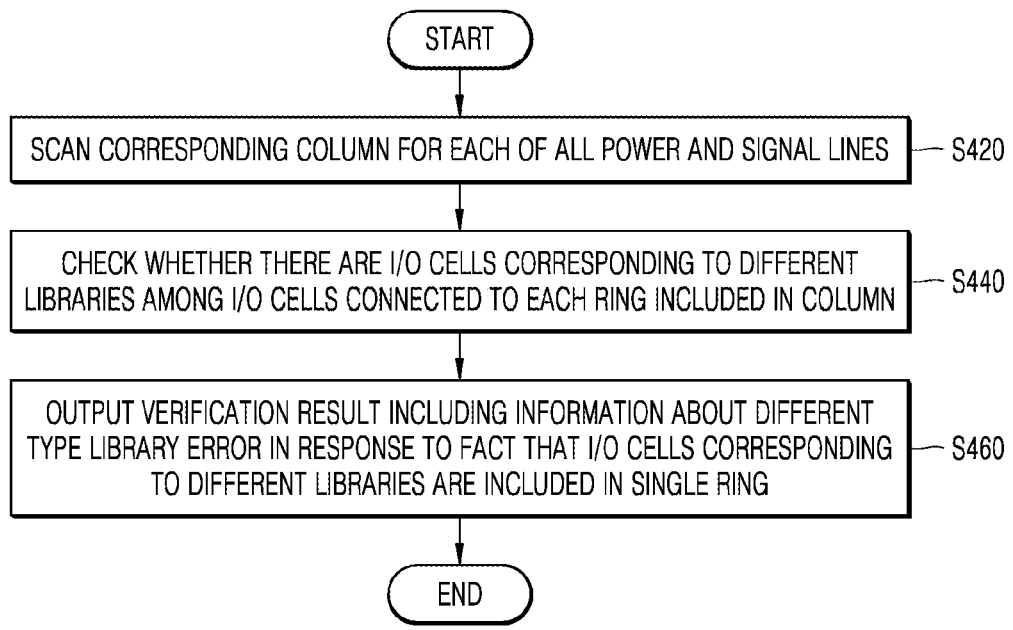
FIG. 10A is a flowchart of a semiconductor chip design method according to an example embodiment of the inventive concepts.

FIG. 10A is a flowchart of a semiconductor chip design method according to an example embodiment of the inventive concepts. FIG. 10A may be particularly a flowchart of a method of detecting a different type library error having occurred in a semiconductor chip design during operation S164 of FIG. 4. FIG. 10A will be described with reference to FIG. 1 together.

In operation S420, the computing device 10 may scan a plurality of columns respectively corresponding to a plurality of power and signal lines by using merged data. For example, referring to FIG. 7 together, the computing device 10 may scan all columns corresponding to the first to mth power and signal lines PSL1 to PSLm in the merged data DATA_M.

In operation S440, the computing device 10 may determine whether there are two or more input/output cells corresponding to different libraries among input/output cells connected to each ring included in a corresponding column. Herein, a ring included in a column may indicate a path from a first cell to which no power and signal line is connected to a second cell to which no power and signal line is connected. Each power and signal line may include only one ring or a plurality of rings.

In operation S460, the computing device 10 may determine that a different type library error has occurred in the semiconductor chip design, in response to the fact that input/output cells corresponding to different libraries are included in a single ring included in a corresponding column, and output the verification result RST including information about the different type library error. For example, the verification result RST may include at least one of data indicating that there is a different type library error, information about a signal line on which the different type library error has occurred, and information about an input/output cell on which the different type library error has occurred.

An operation, performed by the computing device 10, of detecting a different type library error will be described below with reference to FIG. 10C.

Figure 10B:
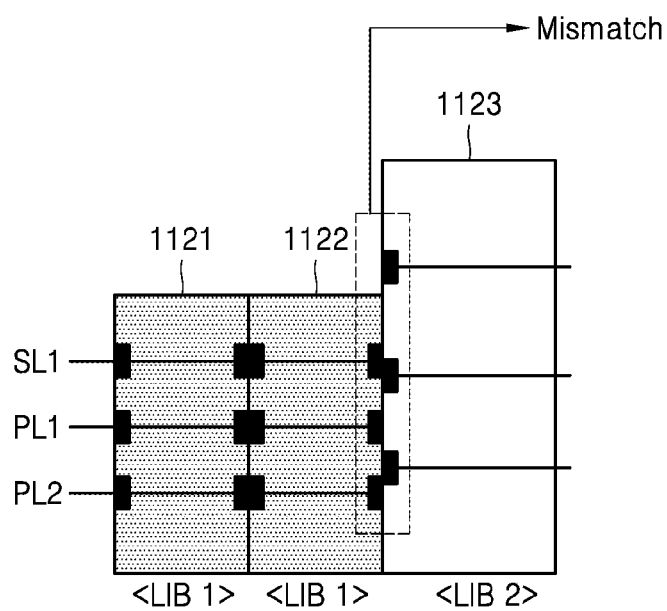
FIG. 10B is a view for describing a problem which may occur when input/output cells belonging to different type libraries are connected in a single ring.

FIG. 10B is a view for describing a problem which may occur when input/output cells belonging to different type libraries are connected in a single ring.

FIG. 10B shows, for convenience of description, an example embodiment in which power and signal lines include the first power line PL1, the second power line PL2, and the first signal line SL1.

Referring to FIG. 10B, a first input/output cell 1121 and a second input/output cell 1122 may belong to a first library LIB 1, and a third input/output cell 1123 may belong to a second library LIB 2. Input/output cells belonging to the same library may have the same size and have the same locations of pins to which power and signal lines are connected. According to an example embodiment of the inventive concepts, for some libraries, input/output cells belonging to different libraries may have different sizes and have different locations of pins to which power and signal lines are connected. For example, a size of the third input/output cell 1123 may differ from a size of the first input/output cell 1121 and the second input/output cell 1122, and locations of pins of the third input/output cell 1123 to which power and signal lines are connected may differ from locations of pins of the first input/output cell 1121 and the second input/output cell 1122 to which power and signal lines are connected.

Therefore, as shown in FIG. 10B, when input/output cells belonging to different libraries are connected to a single ring, an error occurs in arrangement of the input/output cells.

FIG. 10C is a view of the merged data DATA_M and different type library error detection according to an example embodiment of the inventive concepts. Particular details of the merged data DATA_M shown in FIG. 10C are only illustrative for convenience of description. FIG. 10C will be described with reference to FIGS. 1 and 10A together.

Referring to FIG. 10C, the merged data DATA_M may further include information about a library to which each input/output cell belongs. A configuration of a computing device and/or data for the merged data DATA_M will be described with reference to FIGS. 11A and 11B The computing device 10 may scan, in operation S420, columns corresponding to the first to fourth power lines PL1 to PL4 and the first signal line SL1 in the merged data DATA_M.

The second to seventh input/output cells CELL_2 to CELL_7 belonging to one signal line ring may be connected to the first signal line SL1. However, among the second to seventh input/output cells CELL_2 to CELL_7 belonging to one signal line ring, the second to fifth input/output cells CELL_2 to CELL_5 and the seventh input/output cell CELL_7 belong to the first library LIB 1, whereas the sixth input/output cell CELL_6 belongs to the second library LIB2. Therefore, the computing device 10 may determine, in operation S440, that a different type library error has occurred. Accordingly, the computing device 10 may output, in operation S460, the verification result RST including information about the different type library error.

Figure 11A:
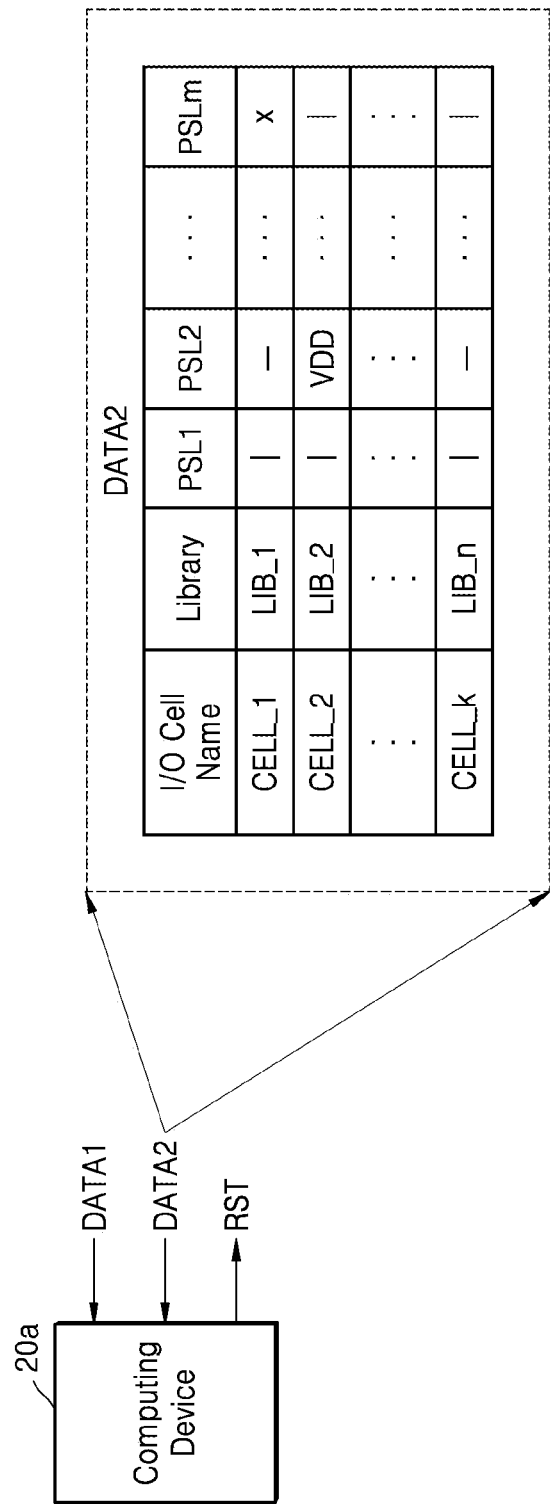
FIGS. 11A and 11B are views of computing devices according to an example embodiment of the inventive concepts.
Figure 11B:
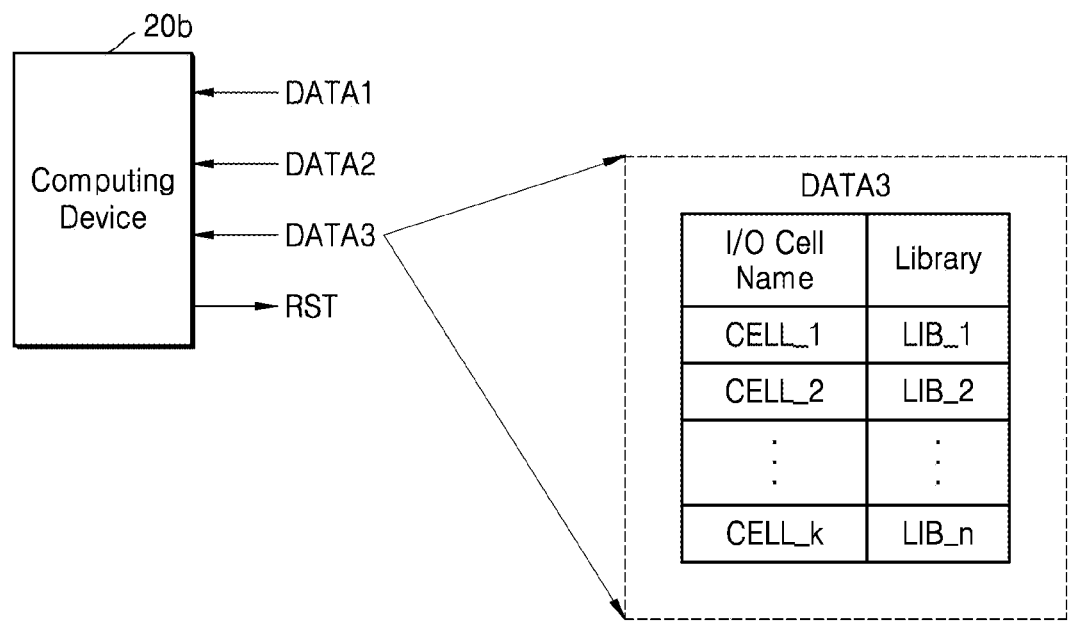

FIGS. 11A and 11B are views of computing devices 20a and 20b according to an example embodiment of the inventive concepts. FIGS. 11A and 11B particularly show operations and configurations of computing devices required to detect a different type library error with reference to FIGS. 10A and 10B. Differences of FIGS. 11A and 11B from FIG. 1 will be mainly described.

Referring to FIG. 11A, like FIG. 1, the computing device 20a may acquire the first data DATA1 and the second data DATA2 and output the verification result RST based on the first data DATA1 and the second data DATA2. However, unlike FIG. 1, the second data DATA2 may further include a plurality of pieces of library information respectively corresponding to a plurality of input/output cells.

Referring to FIG. 11B, unlike FIG. 1, the computing device 20b may acquire the first data DATA1, the second data DATA2, and third data DATA3 and output the verification result RST based on the first data DATA1, the second data DATA2, and the third data DATA3. Herein the third data DATA3 may include a plurality of pieces of library information respectively corresponding to a plurality of input/output cells. The computing device 20b may generate the merged data DATA_M as shown in FIG. 10C by merging the first data DATA1, the second data DATA2, and the third data DATA3.

Figure 12:
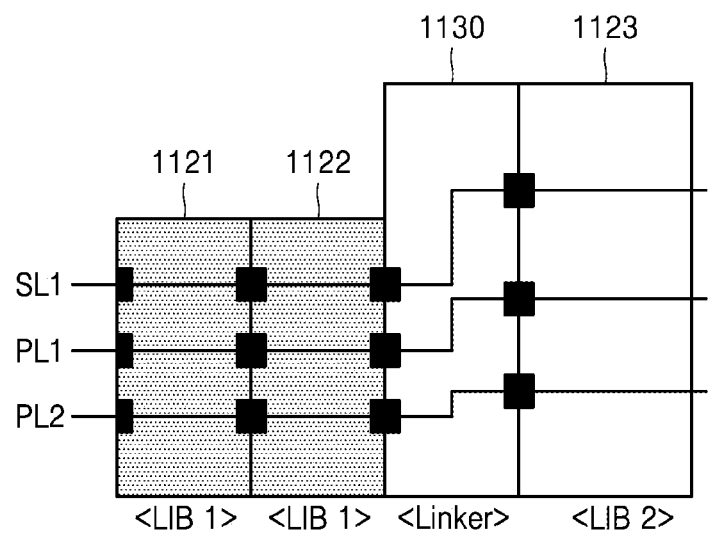
FIG. 12 is a view of input/output cells including a linker cell, according to an example embodiment of the inventive concepts.

FIG. 12 is a view of input/output cells 1121, 1122, 1123, and 1130, one of which is referred to as a linker cell 1130, according to an example embodiment of the inventive concepts. FIG. 12 is to describe a feature of correcting arrangement of input/output cells with reference to FIGS. 10A and 10C. FIG. 12 will also be described with reference to FIG. 1 together.

As described above with reference to FIG. 10B, when input/output cells belonging to different libraries are directly connected to each other, a different type library error is caused. When the verification result RST including information about a different type library error is output, the computing device 10 may correct an arrangement error by using the linker cell 1130 as shown in FIG. 12.

Herein, the linker cell 1130 may indicate a cell configured to help routing between input/output cells belonging to different libraries.

While the inventive concepts has been particularly shown and described with reference to some example embodiments thereof, it will be understood that various changes in form and details may be made therein without departing from the spirit and scope of the following claims.

What is claimed is:

1. A method of designing a semiconductor chip, the method comprising:
    acquiring first data indicating an arrangement for a plurality of cells on the semiconductor chip;
    acquiring second data indicating routing between the plurality of cells and power and signal lines, the power and signal lines including at least one power line and at least one signal line;
    generating merged data indicating, for each of the plurality of cells, which of the power and signal lines are connected thereto by merging routing information within the second data with corresponding ones of the plurality of cells in the first data;
    detecting at least one error in the arrangement of the plurality of cells based on the merged data; and
    outputting a verification result based on the at least one error such that the verification result that is output provides an indication of the at least one error.

2. The method of claim 1, further comprising:
    modifying at least one of the first data or the second data based on the verification result.

3. The method of claim 1, further comprising:
    outputting design data for manufacturing the semiconductor chip based on the first data, the second data, and the verification result; and
    manufacturing the semiconductor chip based on the design data.

4. The method of claim 1, wherein the detecting the at least one error comprises:
    detecting the at least one error among a short error, a float error, and a different type library error based on the merged data.

5. The method of claim 4, wherein the second data includes a matrix having a plurality of rows corresponding to respective ones of the plurality of cells and a plurality of columns corresponding to respective ones of the power and signal lines, and the matrix including data indicating whether a cell is connected to a corresponding one of the power and signal lines, or indicating a type of a power source or a control signal which the cell supplies to the corresponding one of the power line and signal lines.

6. The method of claim 5, wherein the detecting of the at least one error comprises:
    scanning, in the merged data, the plurality of columns corresponding to respective ones of the power and signal lines; and
    detecting the short error in response to detecting that two different types of power sources are connected to a ring corresponding to one of the plurality of columns.

7. The method of claim 5, wherein the detecting of the at least one error comprises:
    scanning, in the merged data, the plurality of columns corresponding to respective ones of the power and signal lines; and
    detecting the float error in response to detecting that no power source is connected to a ring corresponding to one of the plurality of columns.

8. The method of claim 5, wherein the second data further includes a plurality of pieces of library information corresponding to respective ones of the plurality of cells, and the detecting of the at least one error comprises:
    scanning, in the merged data, the plurality of columns corresponding to respective ones of the power and signal lines;
    determining whether cells corresponding to different libraries are included in a same ring corresponding to one of the plurality of columns based on the plurality of pieces of library information; and
    detecting the different type library error in response to determining that the cells corresponding to the different libraries are included in the same ring.

9. The method of claim 5, wherein the acquiring of the merged data includes acquiring the merged data by merging the first data, the second data and third data, the third data including a plurality of pieces of library information corresponding to respective ones of the plurality of cells, and the detecting of the at least one error comprises:
    scanning, in the merged data, the plurality of columns corresponding to respective ones of the power and signal lines;
    determining whether cells corresponding to different libraries are included in a same ring corresponding to one of the plurality of columns based on the plurality of pieces of library information; and
    detecting the different type library error in response to determining that the cells corresponding to the different libraries are included in the same ring.

10. The method of claim 1, further comprising:
    outputting correction information indicating a correction to perform on one or more of the first data or the second data based on a type and details of the error included in the verification result.

11. A method of designing a semiconductor chip, the method comprising:
    acquiring first data indicating an arrangement for a plurality of cells on the semiconductor chip;
    acquiring second data including routing information and a plurality of pieces of library information, the routing information indicating routing between the plurality of cells and power sources, the plurality of pieces of library information corresponding to the plurality of cells;
    generating merged data indicating, for each of the plurality of cells, which of the power sources are connected thereto by merging the routing information with corresponding ones of the plurality of cells in the first data;
    detecting at least one error among a short error, a float error, and a different type library error based on the merged data; and
    outputting a verification result based on the at least one error such that the verification result that is output provides an indication of the at least one error.

12. The method of claim 11, wherein the second data includes a matrix having a plurality of rows corresponding to respective ones of the plurality of cells and a plurality of columns corresponding to respective ones of the power sources, and the matrix includes data indicating whether a cell is connected to a corresponding one of the power sources, or indicating a type of the power sources or a control signal which the cell supplies to the corresponding one of the power sources.

13. A computing device comprising:
    at least one processor; and
    a memory storing instructions that, when executed by the at least one processor, configure the computing device to,
        acquire first data indicating an arrangement for a plurality of cells on a semiconductor chip;
        acquire second data indicating routing between the plurality of cells and power and signal lines, the power and signal lines including at least one power line and at least one signal line;
        generate merged data indicating, for each of the plurality of cells, which of the power and signal lines are connected thereto by merging routing information within the second data with corresponding ones of the plurality of cells in the first data;
        detecting at least one error in the arrangement of the plurality of cells based on the merged data; and
        outputting a verification result based on the at least one error such that the verification result provides an indication of the at least one error.

14. The computing device of claim 13, wherein the instructions, when executed by the at least one processor, configure the computing device to detect the at least one on error by,
    detecting the at least one error among a short error, a float error, and a different type library error based on the merged data.

15. The computing device of claim 14, wherein the second data includes a matrix having a plurality of rows corresponding to respective ones the plurality of cells and a plurality of columns corresponding to respective ones of the power and signal lines, and the matrix includes data indicating whether a cell is connected to a corresponding one of the power and signal lines, or indicating a type of a power source or a control signal which the cell supplies to the corresponding one of the power line and signal lines.

16. The computing device of claim 15, wherein the instructions, when executed by the at least one processor, configure the computing device to detect the at least one error by,
    scanning, in the merged data, the plurality of columns corresponding to respective ones of the power and signal lines; and
    detecting the short error in response to detecting that at least two different power sources are connected to a ring corresponding to one of the plurality of columns.

17. The computing device of claim 15, wherein the instructions, when executed by the at least one processor, configure the computing device to detect the at least one error by,
    scanning, in the merged data, the plurality of columns corresponding to respective ones of the power and signal lines; and
    detecting the float error in response to detecting that no power source is connected to a ring corresponding to one of the plurality of columns.

18. The computing device of claim 15, wherein the second data further includes a plurality of pieces of library information corresponding to respective ones of the plurality of cells, and the instructions, when executed by the at least one processor, configure the computing device to detect the at least one error by,
    scanning, in the merged data, the plurality of columns corresponding to respective ones of the power and signal lines;
    determining whether cells corresponding to different libraries are included in a same ring corresponding to one of the plurality of columns based on the plurality of pieces of library information; and
    detecting the different type library error in response to detecting that the cells corresponding to the different libraries are included in the same ring.

19. The computing device of claim 15, wherein the instructions, when executed by the at least one processor, configure the computing device to,
    acquire the merged data by acquiring the merged data by merging the first data, the second data and third data, the third data including a plurality of pieces of library information corresponding to respective ones of the plurality of cells, and
    detect the at least one error by,
        scanning, in the merged data, the plurality of columns corresponding to respective ones of the power and signal lines;
        determining whether cells corresponding to different libraries are included in a same ring corresponding to one of the plurality of columns based on the plurality of pieces of library information; and
        detecting the different type library error in response to determining that the cells corresponding to the different libraries are included in the same ring.

20. A non-transitory computer-readable recording medium comprising a program, which when executed by a computer, configures the computer to perform the method of designing the semiconductor chip according to claim 1.

* * * * *